United States Patent
Dujol et al.

(10) Patent No.: US 10,662,789 B2
(45) Date of Patent: May 26, 2020

(54) TURBINE BLADE WITH OPTIMISED COOLING AT THE TRAILING EDGE OF SAME COMPRISING UPSTREAM AND DOWNSTREAM DUCTS AND INNER SIDE CAVITIES

(71) Applicant: SAFRAN AIRCRAFT ENGINES, Paris (FR)

(72) Inventors: Charlotte Marie Dujol, Saint-Mande (FR); Patrice Eneau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 480 days.

(21) Appl. No.: 15/314,037

(22) PCT Filed: May 26, 2015

(86) PCT No.: PCT/FR2015/051382
§ 371 (c)(1),
(2) Date: Nov. 25, 2016

(87) PCT Pub. No.: WO2015/181488
PCT Pub. Date: Dec. 3, 2015

(65) Prior Publication Data
US 2017/0191368 A1    Jul. 6, 2017

(30) Foreign Application Priority Data

May 28, 2014 (FR) .................................. 14 54869

(51) Int. Cl.
*F01D 5/18* (2006.01)
*F01D 9/04* (2006.01)
(Continued)

(52) U.S. Cl.
CPC .............. *F01D 9/041* (2013.01); *B22C 9/103* (2013.01); *F01D 5/186* (2013.01); *F01D 5/187* (2013.01);
(Continued)

(58) Field of Classification Search
CPC . F01D 5/18; F01D 9/041; F01D 5/186; F01D 5/187; F01D 9/065; B22C 9/103;
(Continued)

(56) References Cited

U.S. PATENT DOCUMENTS 4,252,501 A * 2/1981 Peill ........................ F01D 5/189
415/115
5,820,774 A * 10/1998 Dietrich .................... B22C 9/10
249/61
(Continued)

FOREIGN PATENT DOCUMENTS

EP     1 065 343 A2    1/2001
EP     1 126 134 A1    8/2001
(Continued)

OTHER PUBLICATIONS

International Search Report dated Aug. 27, 2015 in PCT/FR2015/051382 filed May 26, 2015.
(Continued)

*Primary Examiner* — Woody A Lee, Jr.
*Assistant Examiner* — Brian Christopher Delrue
(74) *Attorney, Agent, or Firm* — Oblon, McClelland, Maier & Neustadt, L.L.P.

(57) ABSTRACT

A turbine blade including a root, a vane extending in a spanwise direction, ending at a tip and including a leading edge and a trailing edge and a pressure-side wall and a suction-side wall, the vane further including at least one upstream duct configured to collect air at the root to cool the leading edge, discharging the air through holes passing
(Continued)

through the wall of the leading edge; at least one downstream duct separate from the upstream duct and configured to collect air at the root to cool the trailing edge, discharging the air through holes passing through the pressure wall upstream from the trailing edge; an inner side cavity running along the pressure-side wall to form a heat shield insulating the downstream duct.

5 Claims, 5 Drawing Sheets

(51) Int. Cl.
*B22C 9/10* (2006.01)
*F01D 9/06* (2006.01)
(52) U.S. Cl.
CPC ........ *F01D 9/065* (2013.01); *F05D 2230/211* (2013.01); *F05D 2240/121* (2013.01); *F05D 2240/122* (2013.01); *F05D 2240/123* (2013.01); *F05D 2240/124* (2013.01); *F05D 2240/125* (2013.01); *F05D 2250/75* (2013.01); *F05D 2260/202* (2013.01); *F05D 2260/204* (2013.01); *Y02T 50/676* (2013.01)
(58) Field of Classification Search
CPC ......... F05D 2230/211; F05D 2240/121; F05D 2240/122; F05D 2240/123; F05D 2240/124; F05D 2240/125; F05D 2250/75; F05D 2260/202; F05D 2260/204; Y02T 50/676
See application file for complete search history.

(56) References Cited

U.S. PATENT DOCUMENTS

| | | |
|---|---|---|
| 5,951,256 A | 9/1999 | Dietrich |
| 6,068,806 A | 5/2000 | Dietrich |
| 6,168,381 B1* | 1/2001 | Reddy .................... F01D 5/186 415/116 |
| 2006/0096092 A1* | 5/2006 | Pietraszkiewicz ...... F01D 5/147 29/889.721 |
| 2008/0044282 A1 | 2/2008 | Pietraszkiewicz et al. |
| 2008/0056908 A1* | 3/2008 | Morris .................... F01D 5/187 416/97 R |
| 2008/0080979 A1* | 4/2008 | Brassfield ............... B22C 9/043 416/97 R |
| 2009/0285683 A1* | 11/2009 | Pietraszkiewicz ...... F01D 5/186 416/92 |
| 2010/0129194 A1* | 5/2010 | Propheter-Hinckley .................... B22C 7/02 415/115 |
| 2012/0207616 A1 | 8/2012 | Propheter-Hinckley et al. |
| 2012/0269647 A1* | 10/2012 | Vitt ........................ F01D 5/186 416/97 R |
| 2014/0199177 A1* | 7/2014 | Propheter-Hinckley .................... F01D 5/187 416/97 R |
| 2015/0098835 A1 | 4/2015 | Propheter-Hinckley et al. |

FOREIGN PATENT DOCUMENTS

| | | |
|---|---|---|
| EP | 1 655 452 A2 | 5/2006 |
| EP | 1 882 819 A1 | 1/2008 |
| EP | 1 895 098 A2 | 3/2008 |
| EP | 2 119 873 A2 | 11/2009 |
| EP | 2 189 230 A1 | 5/2010 |
| WO | 2014/109819 A1 | 7/2014 |
| WO | WO-2014109819 A1 * | 7/2014 ............. F01D 5/187 |

OTHER PUBLICATIONS

French Search Report dated Mar. 6, 2015 in French Application 1454869 filed May 28, 2014.

* cited by examiner

TURBINE BLADE WITH OPTIMISED COOLING AT THE TRAILING EDGE OF SAME COMPRISING UPSTREAM AND DOWNSTREAM DUCTS AND INNER SIDE CAVITIES

TECHNICAL FIELD

The invention relates to a blade of an aircraft engine of the turbomachine type, such as for example a double flow turbo engine or a double flow turboprop.

PRIOR ART

In such an engine, the outside air is taken into an inlet sleeve in order to pass through a blower comprising a series of rotating vanes before being split into a central primary flow and a secondary flow surrounding the primary flow.

The primary flow is then compressed before arriving in a combustion chamber, after which it is expanded by passing through a set of turbines before being discharged to the rear by generating thrust. The secondary flow is propelled directly to the rear by the blower in order to generate an additional thrust.

The expansion in the turbines, which makes it possible to drive the compressor and the blower, takes place at a high temperature due to the fact that it is produced immediately after the combustion. This turbine is as such designed and dimensioned to operate in severe temperature, pressure and fluid flow conditions.

Each turbine comprises a succession of stages with each one comprising a series of blades oriented radially and regularly spaced around a rotating shaft of the engine. This central shaft bears the rotating elements of the turbine as well as the rotating elements of the compressor and of the blower.

Concretely, the blades of the turbine which are subjected to the most severe of conditions are those of the first expansion stages of this turbine, namely the stages that are the closest to the combustion zone and which are commonly referred to as high pressure stages.

Generally, the increased needs in performance and changes in regulations lead to designing engines of smaller size that operate in increasingly harsh environments. This implies increasing the resistance and the performance of the high pressure turbine blades in particular pertaining to their resistance in temperature.

However, the existing improvements with regards to materials and the coatings of these blades are not enough to allow them to withstand the high temperatures that can be reached by the flow downstream of the combustion chamber. This situation leads to reconsidering the cooling of these blades in order to improve it so that they can withstand these new operating conditions.

This cooling is provided by circulating cool air inside these blades that is taken in the turbo engine upstream of the combustion. This air is taken at the blade root, to be conveyed along an inner circuit of the blade in order to cool it, and it is discharged outside of the blade by holes passing through the wall of this blade and distributed over this wall. These holes are used to discharge the cooling air, but they also create on the outer surface of the blade a film of air that is cooler than the air coming from the combustion, which also contributes to limiting the temperature of the blade.

In order to increase the effectiveness of the cooling, the interior regions of the blade in which the cooling air circulates comprise artifices, i.e. inner reliefs that disturb the fluid flow of the cooling air in order to increase the heat transfer from the wall of the blade to this cooling air circulating in the inner ducts of the blade.

These cooling architectures are penalised by the fact that the length of the inner circuit of the blade gives rise to air that is excessively heated when it reaches the end of this circuit, in such a way that its cooling effectiveness is limited in the regions of the end of travel, and in particular at the blade tip where is it sought on the contrary to obtain increased cooling effectiveness.

The purpose of the invention is to propose a blade structure that makes it possible to improve the cooling effectiveness of this blade.

SUMMARY OF THE INVENTION

To this effect, the invention has for object a turbine blade of a turbomachine such as a turboprop or a turbo engine, with this blade comprising a vane, a vane borne by this root, with this vane comprising a leading edge and a trailing edge located downstream of the leading edge, with this vane comprising a pressure-side wall and a suction-side wall spaced laterally from one another and with each one connecting the leading edge to the trailing edge, with this vane comprising:

at least one upstream duct collecting cooling air at the root in order to cool the leading edge by discharging this air through holes passing through the wall of the vane at its leading edge;

at least one downstream duct separate from the upstream duct collecting cooling air at the root in order to cool the trailing edge by discharging this air through holes passing through the pressure-side wall upstream of the trailing edge;

an inner side cavity running along the pressure-side wall in order to form a heat shield insulating the downstream duct from the pressure-side wall.

With this arrangement, the cooling of the trailing edge is substantially improved by the formation of a cooling film on the outer face of the pressure-side wall upstream of this trailing edge. Thanks to the supply by the downstream duct that is thermally insulated, this film of air in addition has a low temperature.

The invention also relates to a blade defined as such, further comprising cooling slots passing through its pressure-side wall along its trailing edge and a downstream ramp of supplying these cooling slots with cooling air, as well as an upper cavity located at the tip of the blade in order to supply with air the slot of the trailing edge which is closest to this tip, with this upper cavity being separate from the downstream ramp and being supplied with air by the downstream duct.

The invention also relates to a blade defined as such, comprising another inner side cavity running along the suction-side wall in order to form a heat shield that thermally insulates the downstream duct from the suction-side wall.

The invention also relates to a blade defined as such, comprising an upstream ramp for supplying the cooling holes of the leading edge, and an upstream duct for the calibrated supply of this upstream ramp, and in which each inner side cavity forms a heat shield with an extent that is sufficient to jointly insulate this upstream duct and the downstream duct.

The invention also relates to a blade defined as such, wherein each inner side cavity is provided with promoters of turbulence and/or deflectors in order to increase therein the heat exchanges, and wherein the upstream duct and the downstream duct have smooth walls in order to limit load losses.

The invention also relates to means for moulding for the manufacture of a blade defined as such, comprising imprints and a set of cores intended for the forming of inner ducts and ramps, and possibly inner cavities forming a shield.

The invention also relates to a turbine of a turbomachine comprising a blade such as defined hereinabove.

The invention also relates to a turbomachine comprising a turbine such as defined hereinabove.

DETAILED DISCLOSURE OF PARTICULAR EMBODIMENTS

Figure 1:
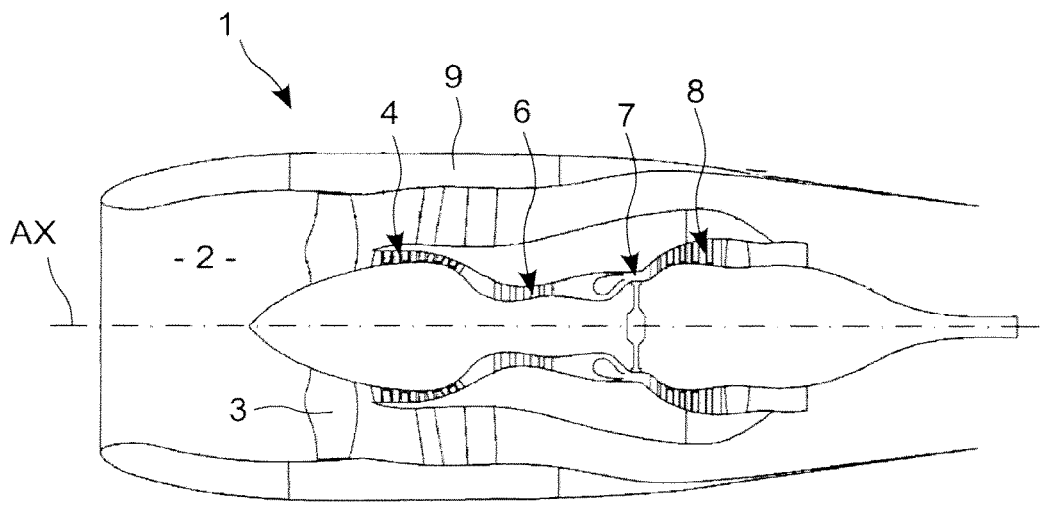
FIG. 1 is a diagrammatical view of a double flow turbo engine as a longitudinal cross-section.

As can be seen in FIG. 1, a front portion of a double flow turbo engine 1 comprises an inlet sleeve 2 wherein air is taken in before being sucked by the vanes of a blower 3. After having passed the region of the blower, the air is divided into a central primary flow and a secondary flow that surrounds the primary flow.

The primary flow of air then passes through a first compressor 4 located immediately after the blower 3 while the secondary flow is propelled to the rear in order to directly generate an additional thrust by being blown around the primary flow.

The primary flow then passes through a second stage of compression 6, before reaching a chamber 7 where the combustion thereof takes place, after injection and vaporisation of a fuel. After combustion, this primary flow expands in a high-pressure turbine 8 then in a low-pressure turbine not shown in order to drive in rotation the compression stages and the blower, before being expulsed towards the rear of the engine in order to generate a thrust.

The engine 1 and its components have a shape of revolution about a longitudinal axis AX. It comprises in particular an outer casing 9 with it too having a shape of revolution and extending from the front of the engine where it delimits the air inlet sleeve, to the rear portion where it delimits the duct through which the primary and secondary flows are discharged, with the front and the rear to be considered with respect to the forward direction of the aircraft provided with this turbo engine. This casing 9 supports the rotating components located at the centre of the engine and which comprise a rotating shaft bearing the vanes of the blower as well as the compression stages and the turbine with their blades.

Figure 2:
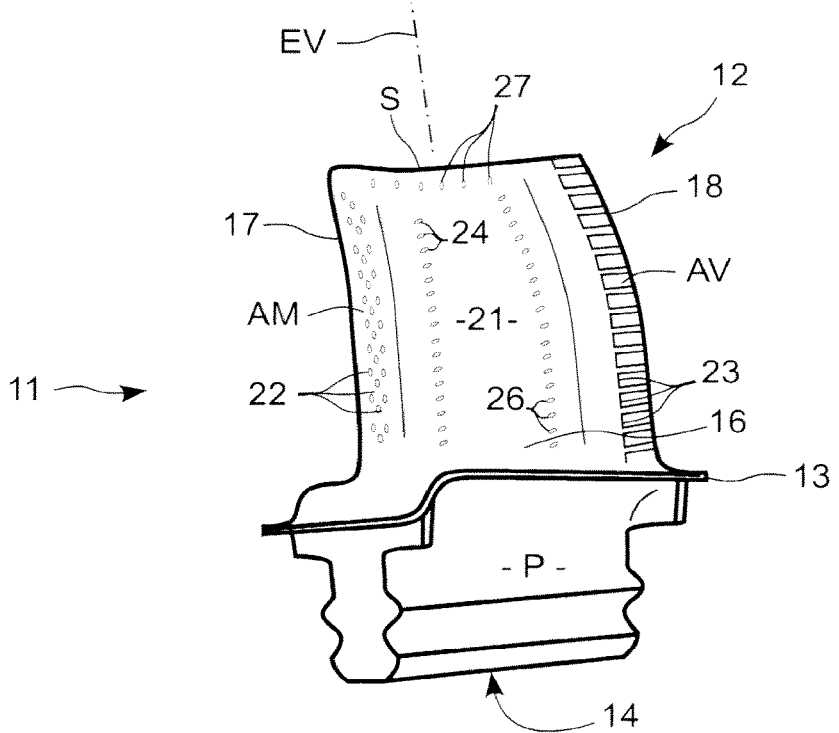
FIG. 2 is a perspective view of a blade of a turbo engine turbine shown in FIG. 1.

Such a blade, which is marked as 11 in FIG. 2, comprises a root P by which it is fixed to a rotating body not shown, referred to as a turbine disc, and a vane 12 borne by this root P and constituting the aerodynamic portion of this blade. As can be seen in FIG. 2, the blade 11 comprises between the root P and the vane 12 an intermediate region 13 called platform.

The unit formed by the root P and the vane 12 is a unique hollow single-piece part coming from casting and comprising inner ducts through which circulates the cooling air. These inner ducts not shown in FIG. 2 comprise intake vents that open in the lower face 14 of the root P and through which these ducts are supplied with cool air. The hollow wall of the vane 12 comprises through-holes and slots through which the cooling air is discharged.

The vane 12 has a left twisted shape that has a contour that is substantially rectangular, approaching a parallelepiped. It comprises a base 16 through which it is connected to the root P and which extends roughly parallel to the axis of rotation AX. It also comprises a leading edge 17 oriented radially with respect to the axis AX and located at the upstream AM of the blade, i.e. the front region of this blade, with respect to the forward direction of the engine that it is provided with in service. This blade also comprises, a trailing edge 18 oriented roughly parallel to the leading edge 17 by being spaced from the latter along the axis AX in order to be located at the downstream region AV or behind the blade. It further comprises a tip S roughly parallel to the base 16 and spaced from the latter according to a radial direction with respect to the axis AX.

The two main walls of this blade are its pressure-side wall 21, which is the visible wall in FIG. 2, and its suction-side wall which is the opposite wall spaced from the pressure-side wall, and which is not visible in FIG. 2 due to the fact that it is masked by the pressure-side wall 21. The pressure-side and suction-side walls are brought together at the leading edge 17, at the trailing edge 18 and also in the region of the tip S of this blade. These walls are spaced from one another at the base 16 in order to allow for the intake of cooling air in the inner region of the vane.

The leading edge 17 has a convex shape and it is provided with a series of cooling holes 22 passing through the wall of the blade in this region. The trailing edge 18 has a tapered shape, and it comprises a series of cooling slots 23. These slots 23 are slots with low lengths spaced from one another by being located in the extension one from the other, in order to constitute a unit that runs along the end of the trailing edge 18.

Each slot 23 passes through the wall of the blade in order to take cooling air inside this blade and blow it on the pressure-side wall at the trailing edge. Complementarily, the trailing edge is provided with outer ribs oriented parallel to the axis AX in order to channel this cooling air.

During operation, the fluid in which this blade 11 is located is displaced with respect to the latter from the leading edge 17 to the trailing edge 18 by running along the pressure side 21 and the suction side. The pressure-side wall which is subjected to significant heating during operation, comprises a series of holes 24 substantially parallel to the leading edge 17 being located downstream of this leading edge, and another series of holes 26 substantially parallel to the trailing edge 18 by being located upstream of this trailing edge 18 and slots 23 that it comprises. The series of holes 24 and 26 as such extend both according to the spanwise direction EV of the vane, which is the radial direction with respect to the axis AX.

The region of the tip S of the blade 11 has, contrary to the leading edge 17 and to the trailing edge 18, a certain thickness, and this region of the tip moreover has a shape that delimits a hollow portion referred to as a tub.

More concretely, this tip S has a closing wall that connects the pressure-side and suction-side walls, with this closing wall having an orientation that is globally perpendicular to the pressure-side and suction-side walls and parallel to the axis AX, which corresponds to an orientation perpendicular to the spanwise direction EV. This closing wall which is not visible in FIG. 2 is located retracted towards the axis AX with respect to the free edge of the pressure-side wall and to the free edge of the suction-side wall, in such a way that it constitutes, jointly with these edges an open hollow portion in the direction opposite the axis AX.

A series of additional holes 27 passing through the pressure-side wall is provided along the tip S in order to ensure a significant cooling of this vane tip that undergoes substantial stresses due to the fact that it constitutes the portion that has the highest speed with respect to the fluid.

The series of holes 27 extends parallel to the closing wall, and the vane comprises, complementarily, holes that are not visible in FIG. 2 which pass through the closing wall in order to exit into the hollow portion called the tub which is at the tip of the vane.

As indicated hereinabove, such a blade is a hollow single-piece part. It is manufactured by moulding a metal material of the titanium or other type, by using a set of cores in order to delimit the inner ducts of its hollow portion as well as portions of rods in order to form its through-holes. The cores, rods and others are removed once the operation of moulding is completed, typically with a chemical attack process that is able to dissolve these elements without altering the moulded material.

The following figures show internal regions of the blade according to the invention which are shown therein by the shapes of the cores that make it possible to manufacture this blade. In other words, the shapes which are in relief in the figures which follow constitute representations of hollow forms of the blade according to the invention.

The idea at the base of the invention is to improve the cooling of the blade on the pressure side in the region of the trailing edge and of its tip, with this region being the first to be deteriorated during the life of a blade.

This is provided thanks to a downstream duct that extends inside the blade by being thermally protected from the pressure-side wall, and to holes passing through the pressure-side wall to this duct, upstream of the trailing edge, in order to form a film of cooling air of the trailing edge on the side of the outer face of the pressure side.

This downstream duct extends according to the spanwise direction from the root to the tip of the blade in order to be supplied with air directly at the root and so that this air is conveyed in the blade without being heated during its travel before being returned by the cooling holes.

Figure 3:
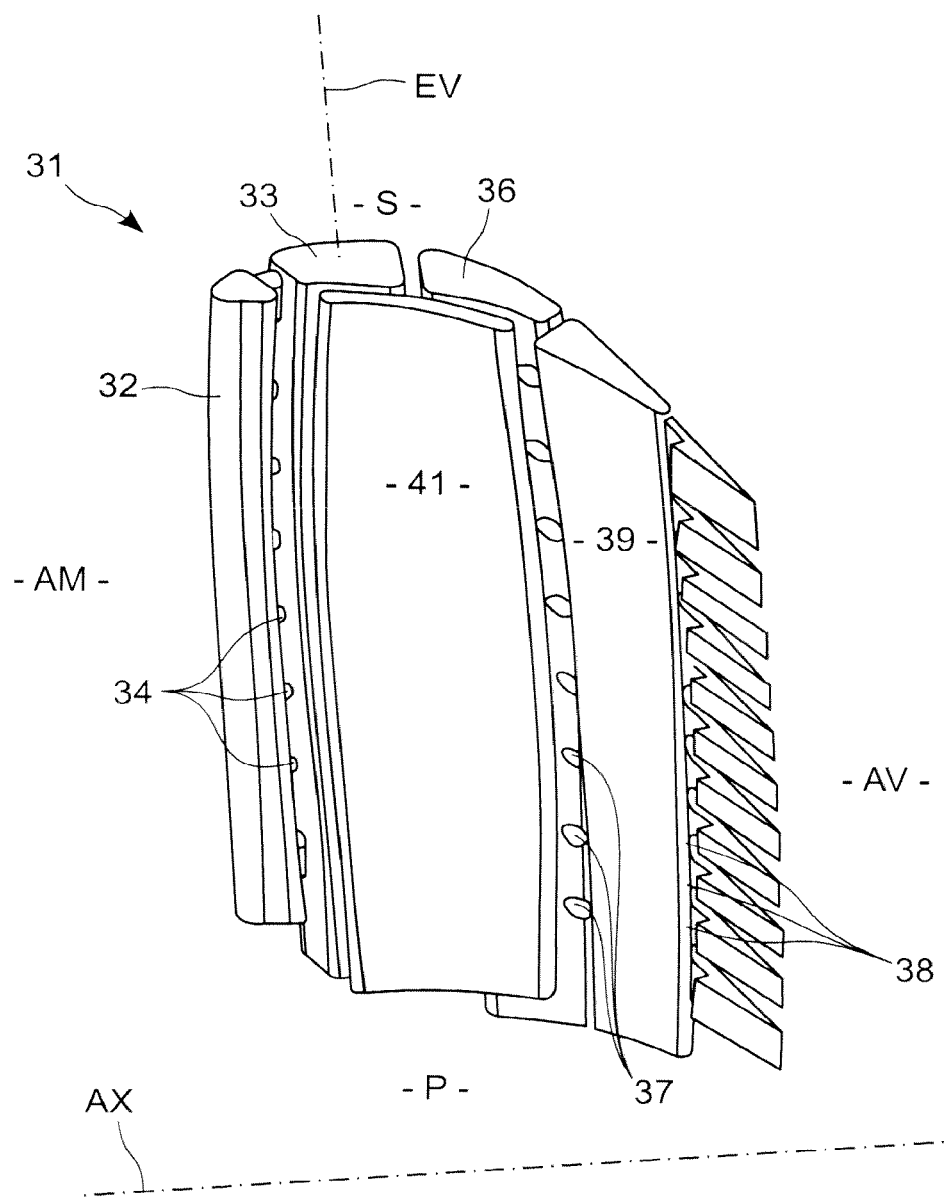
FIG. 3 is a perspective view showing the inner hollow portions of a turbine blade according to a first embodiment of the invention.

The blade according to the invention that is marked as 31 in FIG. 3 comprises an upstream ramp 32 extending from the base of its vane to its tip S. This upstream ramp 32 cools the leading edge by through-holes formed in the portion of the wall corresponding to the leading edge.

This upstream ramp 32 is supplied in a calibrated manner by an upstream duct 33 that runs along this ramp 32, by being located downstream of the latter, and which collects cooling air at the root. The calibrated supply is provided by calibrated passages 34 that are regularly spaced along the spanwise direction EV of the blade and which each connect the upstream duct 33 to the upstream ramp 32.

Each passage 34 is calibrated in order to obtain approximately a flow of air desired in the cooling holes located in the region of the ramp supplied by the passage in question. The flow rate of air desired for a given hole or region is conditioned by the thermal stresses of the leading edge in the region cooled by this hole.

Another duct, referred to as downstream duct and which is marked as 36, runs along the upstream duct by also extending in a substantially straight way from the root P of the blade to its tip S. The pressure-side wall of the blade comprises a series of through-holes 37 distributed in a straight line according to the spanwise direction by being located at the region downstream of the downstream duct 36. Each through-hole 37 as such placed the downstream duct 36 in communication with the outer face of the pressure-side wall upstream of the trailing edge in order to form a cooling film at the outer face of this wall.

The pressure-side wall comprises in the region of the trailing edge a series of cooling slots 38, regularly spaced and extending in the extension one from the other according to the spanwise direction, in order to deliver cooling air to the trailing edge.

These slots are supplied by a downstream ramp 39 of the blade, that extends from the root of the blade, to the region of the tip S by being located between the downstream duct 36 and the trailing edge of the blade. This downstream ramp 39 collects air by its bottom end located in the root of the blade, and it returns this air on cooling slots 38 that it supplies.

Complementarily, the blade according to the invention comprises an inner side cavity 41 of low thickness that runs along the pressure-side wall of the interior side of the blade in order to form a heat shield that protects the upstream duct 33 and the downstream duct 36 from the heat to which the pressure-side wall is subjected.

As can be seen in FIG. 3, this inner cavity 41 has a low thickness and a contour of rectangular shape. It extends in height, i.e. along the spanwise direction, from the root of the blade to its tip, and it laterally has a sufficient extent to form a shield that covers the upstream and downstream ducts.

This side cavity in which can be established a circulation of air makes it possible to thermally insulate the upstream duct and the downstream duct from the pressure-side wall in order to reduce the heating of the air that they convey.

In these conditions, the cooling of the trailing edge of the blade, on the pressure side is significantly improved by the presence of an outer film of cooling air which itself has substantial cooling effectiveness due to the fact that it is supplied with air by a downstream duct that is thermally protected and which therefore has a low temperature.

Figure 4:
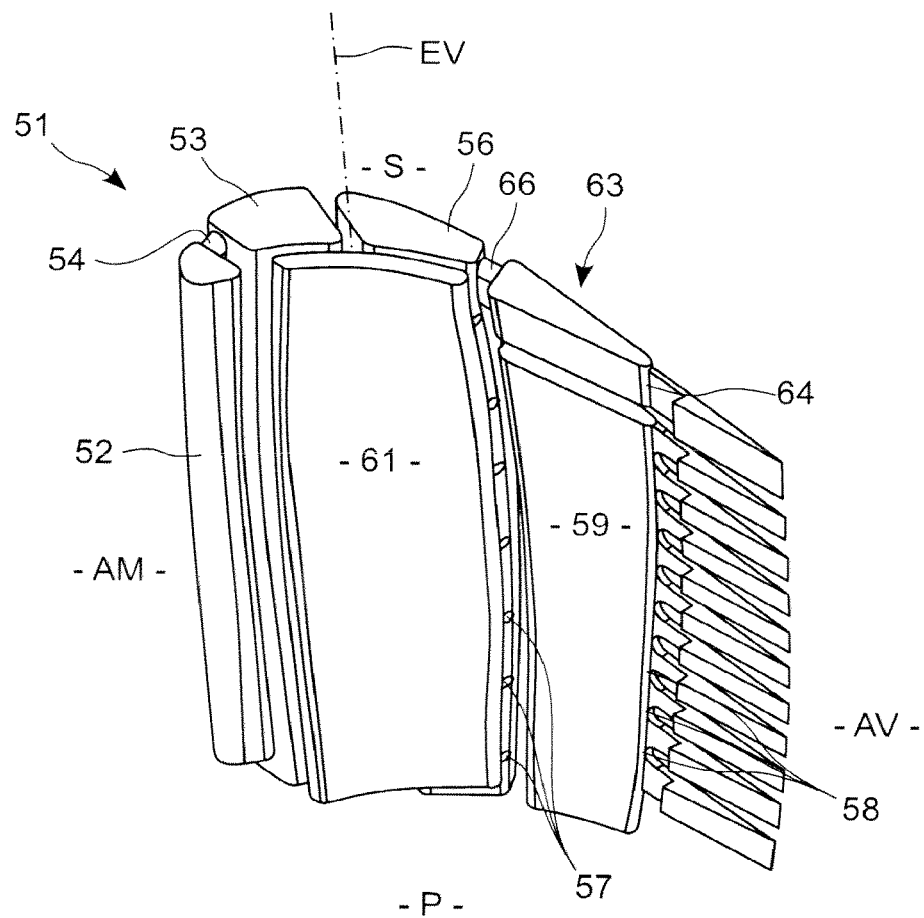
FIG. 4 is a perspective view showing the inner hollow portions of a turbine blade according to a second embodiment of the invention.

According to a second embodiment of the invention corresponding to the blade 51 of FIG. 4, the downstream duct that is thermally protected in order to cool the pressure side upstream of the trailing edge also supplied cool air to the cooling slot of the trailing edge which is the closest to the tip, in such a way as to improve the cooling of this region.

In this second embodiment, the blade 51 also comprises an upstream ramp 52 supplied in a calibrated manner by an upstream duct 53 by calibrated passages 54. It also comprises a downstream duct 56 and its pressure-side wall is provided with a series of through-holes 57 distributed according to the spanwise direction EV at the downstream region of the duct 56 in order to place this duct in communication with the outer face of the pressure-side wall upstream of the trailing edge. The air circulating in the downstream duct 56 is discharged by these holes 57, in order to form here also a cooling film upstream of the trailing edge.

The pressure-side wall of this blade 51 also comprises cooling slots 58 of the trailing edge supplied by a downstream ramp 59, which also extends from the root P to a region located beyond the tip S. It also comprises an inner side cavity 61 of low thickness that runs along the pressure-side wall in order to form a heat shield that protects the upstream duct 53 and the downstream duct 56.

All of these elements 52 to 61 are identical to the elements 32 to 41 of the blade 31 except that the downstream ramp 59 has a lower length than the downstream ramp 39, and that the downstream duct 56 supplies an upper cavity 63 which is located at the tip S of the blade.

The upper cavity 63 is located in the extension of the end of the downstream ramp 59 by being supplied with air by the downstream duct in such a way as to supply the slot 64 of the trailing edge which is closer to the tip than the slots 58, with cooler air in order to further improve the cooling of the blade at the tip of its trailing edge.

This upper cavity 63, extends along a closing wall of the blade that connects the pressure side and the suction side by being oriented according to a direction perpendicular to the spanwise direction EV. This upper cavity 63 is located downstream of the downstream duct 56 by being delimited by the closing wall, the pressure-side wall and the suction-side wall in order to extend to the trailing edge. It is connected to the top end of the downstream duct 56 by an inner connection channel 66.

Thanks to this upper cavity 63, the tip of the trailing edge of the blade, benefits from an effective cooling resulting from the supply in this zone of cool air at a flow rate adjusted to need.

Figure 5:
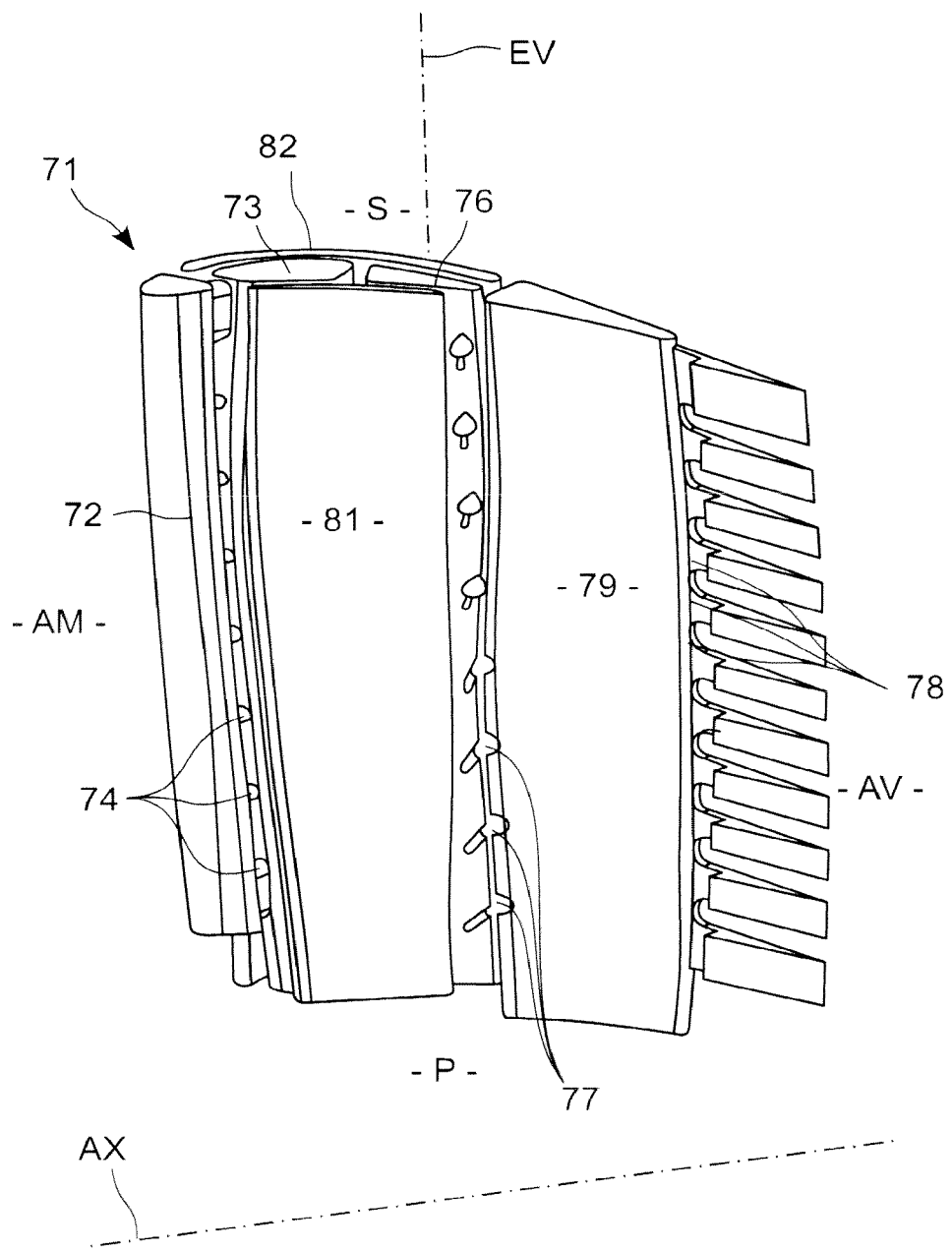
FIG. 5 is a perspective view showing the inner hollow portions of a turbine blade according to a third embodiment of the invention.

According to a third embodiment of the invention which is shown in FIG. 5, the upstream duct and the downstream duct which are thermally insulated by the inner cavity running along the pressure-side wall, are also thermally insulated by another inner cavity of the blade that runs along the suction-side wall.

In this third embodiment which is shown in FIG. 5, the blade 71 also comprises an upstream ramp 72 supplied in a calibrated manner by an upstream duct 73 by means of calibrated passages 74 each connecting the upstream duct to the upstream ramp.

It also comprises a downstream duct 76 and holes 77 passing through its pressure-side wall by being distributed according to the spanwise direction EV at the downstream region of the duct 76 in order to place this duct in communication with the outer face of the pressure-side wall upstream of the trailing edge. The air circulating in the downstream duct 76 is therefore here too discharged by these holes 77, in order to form a cooling film upstream of the trailing edge which substantially improves the cooling of this trailing edge.

The pressure-side wall also comprises cooling slots 78 of the trailing edge supplied with air by a downstream ramp 79, with this downstream ramp also extending from the root P to the region of the tip S of the blade. The blade also comprises an inner side cavity 81 of low thickness that runs along the pressure-side wall in order to form a heat shield that protects the upstream duct 73 and the downstream duct 76 from the heat of the pressure-side wall.

All of these elements 72 to 81 are identical to the elements 32 to 41 of the blade 31 and to the elements 52 to 61 of the blade 51, except that the upstream duct 73 and the downstream duct 76 have a lower thickness, and that in addition to the first side cavity 81 running along the pressure side, this blade 71 further comprises a second inner side cavity 82 that runs along the suction side. The presence of two inner side cavities 81 and 82, which respectively run along the pressure side and the suction side, provide an increased thermal insulation of the upstream duct 73 and of the downstream duct 76.

The second inner side cavity 82 also has a low thickness, and it also extends from the root P to the region of the tip S, having a generally rectangular contour, having a width that is sufficient to mask or cover the upstream duct as well as the downstream duct.

Thanks to these two inner side cavities, the air that is conveyed in the upstream duct and in the downstream duct is very slightly heated during its travel, which contributes to further increasing the effectiveness of the cooling provided upstream of the trailing edge of the pressure side, and of the cooling provided to the leading edge.

Figure 6:
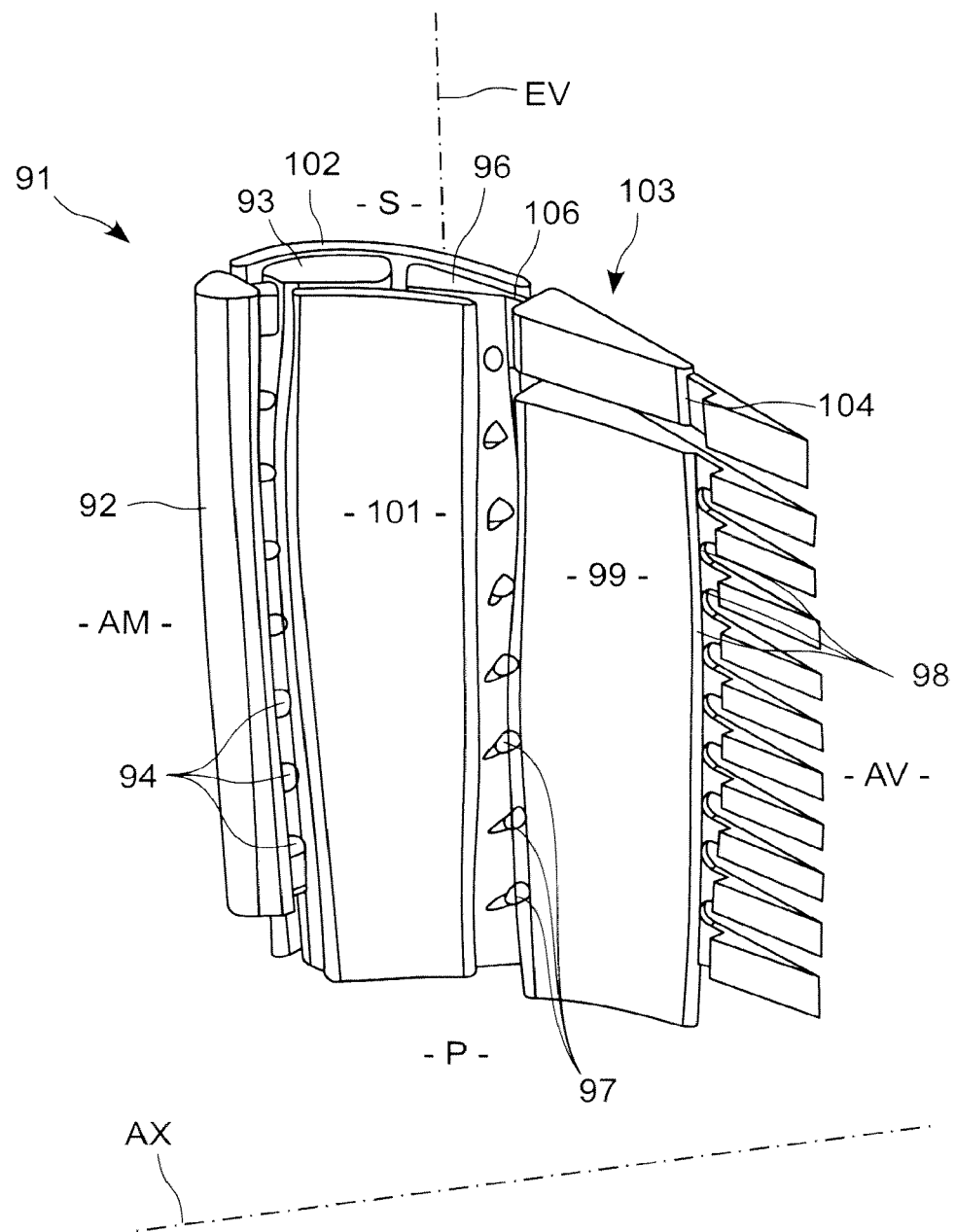
FIG. 6 is a perspective view showing the inner hollow portions of a turbine blade according to a fourth embodiment of the invention.

According to a fourth embodiment of the invention which is shown in FIG. 6, the downstream duct which is thermally protected in order to cool the pressure side upstream of the trailing edge also supplies cool air to the cooling slot of the trailing edge which is the closest to the tip in order to improve the cooling of this region.

In this fourth embodiment that is shown in FIG. 6, the blade 91 also comprises an upstream ramp 92 supplied in a calibrated manner by an upstream duct 93 by calibrated passages 94.

It also comprises a downstream duct 96 and its pressure-side wall is provided with through-holes 97 distributed according to the spanwise direction EV at the downstream region of the duct 96 in order to place this duct in communication with the outer face of the pressure-side wall upstream of the trailing edge. The air circulating in the downstream duct 96 is discharged by these holes 97, here too to form a cooling film upstream of the trailing edge in such a way as to substantially improve the cooling of this trailing edge.

The pressure-side wall also comprises cooling slots 98 of the trailing edge supplied by a downstream ramp 99, that also extends from the root P to the region of the tip S. This blade also comprises an inner side cavity 101 of low thickness that runs along the pressure-side wall and another inner side cavity 102 of low thickness which runs along the suction-side wall, in order to form two heat shields that protect the upstream duct 93 and the downstream duct 96.

All of these elements 92 to 102 are identical to the elements 72 to 82 of the blade 71, except that the downstream ramp 99 has a lower length than the downstream ramp 79, and that the downstream duct 96 supplies an upper cavity 103 that is located at the tip S of the blade.

The upper cavity 103 is located in the extension of the end of the downstream ramp 99 by being supplied with air by the downstream duct 96 in such a way as to supply the slot 104 of the trailing edge which is the closest to the tip with cooler air in such a way as to increase the cooling of the blade at the tip of its trailing edge.

This upper cavity 103, extends along a closing wall of the blade which connects the pressure side and the suction side by being oriented according to a direction perpendicular to the spanwise direction EV. This upper cavity 103 is located downstream of the downstream duct 96 by being delimited by the closing wall, the pressure-side wall and the suction-side wall in order to extend to the trailing edge. It is connected to the top end of the downstream duct 96 by an inner connection channel 106.

Thanks to this upper cavity 103, the tip of the trailing edge of the blade, benefits from an effective cooling resulting from the supply in this zone of a cool air at a flow rate adjusted to need.

Generally, the upper cavity of the second and of the fourth embodiment of the invention makes it possible to supply the region behind or downstream of the tip of the blade with cool cooling air in order to improve its cooling. This cavity also makes it possible to supply the slot of the trailing edge which is the closest to the tip, and possibly the adjacent slots.

Complementarily, holes passing through the pressure-side wall at the level of the upper cavity in order to exit into this upper cavity can be provided in order to improve the cooling of the outer face of the pressure-side wall in the region of the tip of the blade. The upper cavity then supplies fresh air which passes through the pressure-side wall in order to cool its outer face in addition to providing air to the slot closest to the tip, and in addition to cooling by thermal conduction walls of the blade that delimit this upper cavity.

Moreover, holes passing through the walls of the blade and open into the inner side cavities forming a heat shield can be provided in order to establish an optimum circulation of air in these cavities. Each one of these holes is advantageously located at a low pressure zone in order to favour the circulation of air. Each one of these holes ensures that the air collected at the blade root and which is conveyed in a cavity forming a heat shield, is sucked out of the blade, after having been conveyed in this cavity.

In the various embodiments, the cooling of the blade is further optimised by minimising the load losses in each inner duct in order to reduce the heat exchanges therein, and by providing on the contrary promoters of turbulence in each side cavity in order to increase therein the heat exchanges.

The side cavities have as such an increased effectiveness as a heat shield due to the fact that they absorb the heat coming from the outer walls that they run along, and the air circulating in the inner ducts is subjected to little load loss in order to circulate rapidly in order to be heated as little as possible.

The inner ducts such as the upstream duct, the central duct and the downstream duct have as such smooth inner walls in order to favour a rapid circulation of the cooling air by minimising the heat exchanges between this air and the walls of the duct in which it is conveyed. Each side cavity is advantageously provided with deflectors that favour a circulation of air in all of the regions of the cavity. In addition, the inner faces of the cavity are provided with disturbers and/or trippers in order to create turbulences in the circulation of the air in order to favour a high level of heat exchange between the air and the walls that it runs along.

The invention claimed is:

1. A blade of a turbo engine turbine, said blade comprising a root, a vane borne by said root, said vane comprising a leading edge and a trailing edge located downstream of the leading edge, said vane comprising a pressure-side wall and a suction-side wall spaced apart laterally; the pressure-side wall and the suction-side wall connect the leading edge to the trailing edge, said vane comprising:

an upstream ramp for cooling the leading edge,
   at least one upstream duct with a calibrated supply of the upstream ramp, the at least one upstream duct collecting cooling air at the root to supply the upstream ramp in order to cool the leading edge by discharging said cooling air by holes passing through the wall of the vane at the leading edge;
   at least one downstream duct separate from one of the at least one upstream duct collecting cooling air at the root in order to cool the trailing edge by discharging said air through holes passing through the pressure-side wall upstream of the trailing edge;
   cooling slots passing through the pressure-side wall along the trailing edge;
   a downstream ramp for supplying cooling air of the cooling slots; and
   an inner side cavity running along the pressure-side wall between the upstream ramp and the downstream ramp in order to form a heat shield extending from the root of the blade to the tip while still having laterally an extent to form a shield covering the upstream duct and the downstream duct from the pressure-side wall.

2. The blade according to claim 1, further comprising an upper cavity located at the tip of the blade in order to supply with air the slot of the trailing edge which is the closest to said tip, said upper cavity being separate from the downstream ramp and being supplied with air by the downstream duct.

3. The blade according to claim 1, comprising another inner side cavity running along the suction-side wall in order to form a heat shield that laterally has an extent that is sufficient to jointly insulate the upstream duct and the downstream duct from the suction-side wall.

4. A device for moulding for the manufacture of the blade according to claim 1, comprising imprints and a set of cores configured to form inner ducts and ramps, and inner cavities forming a shield.

5. A turbine comprising the blade according to claim 1.

* * * * *